US009256347B2

(12) United States Patent
Finn et al.

(10) Patent No.: US 9,256,347 B2
(45) Date of Patent: Feb. 9, 2016

(54) ROUTING A TELEPORTATION REQUEST BASED ON COMPATIBILITY WITH USER CONTEXTS

(75) Inventors: Peter G. Finn, Brampton (CA); Rick A. Hamilton, II, Charlottesville, VA (US); Dana H. Hangai, Charlottesville, VA (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 12/568,802

(22) Filed: Sep. 29, 2009

(65) Prior Publication Data

US 2011/0078170 A1    Mar. 31, 2011

(51) Int. Cl.
*G06F 3/0481* (2013.01)
*A63F 13/40* (2014.01)
*A63F 13/30* (2014.01)
*G06F 17/30* (2006.01)

(52) U.S. Cl.
CPC ............ *G06F 3/04815* (2013.01); *A63F 13/10* (2013.01); *A63F 13/12* (2013.01); *A63F 2300/8082* (2013.01); *G06F 17/30424* (2013.01)

(58) Field of Classification Search
USPC .......................................... 707/769; 715/757
See application file for complete search history.

(56) References Cited

U.S. PATENT DOCUMENTS

| 6,072,496 | A | 6/2000 | Guenter et al. |
| 6,478,680 | B1 | 11/2002 | Yoshioka et al. |
| 6,769,009 | B1 | 7/2004 | Reisman |
| 6,789,077 | B1 | 9/2004 | Slaughter et al. |
| 6,862,594 | B1 | 3/2005 | Saulpaugh et al. |
| 6,950,791 | B1 | 9/2005 | Bray et al. |
| 7,010,569 | B2 | 3/2006 | Okayasu et al. |
| 7,036,082 | B1 | 4/2006 | Dalrymple et al. |
| 7,293,235 | B1 | 11/2007 | Powers et al. |
| 7,298,378 | B1 * | 11/2007 | Hagenbuch et al. .......... 345/589 |
| 7,301,547 | B2 | 11/2007 | Martins et al. |
| 7,752,648 | B2 | 7/2010 | Shelton et al. |
| 7,951,000 | B2 | 5/2011 | Sakaguchi et al. |
| 2002/0049814 | A1 | 4/2002 | Yoo |
| 2002/0188678 | A1 * | 12/2002 | Edecker et al. ............... 709/204 |
| 2005/0060741 | A1 | 3/2005 | Tsutsui et al. |
| 2005/0206610 | A1 | 9/2005 | Cordelli |
| 2008/0147311 | A1 * | 6/2008 | Zoller et al. ................... 701/201 |
| 2008/0153591 | A1 * | 6/2008 | Deligiannidis ................. 463/31 |
| 2008/0262910 | A1 * | 10/2008 | Altberg et al. ................. 705/14 |

(Continued)

OTHER PUBLICATIONS

Coto et al.; The Computer Game "Spycraft: The Great Game", Feb. 29, 1996, Published by Activision, as evidenced by the web document http://lparchive.org/Spycraft/, Part 4.

(Continued)

*Primary Examiner* — Sherief Badawi
*Assistant Examiner* — Christopher J Raab
(74) *Attorney, Agent, or Firm* — Whitham Curtis Christofferson & Cook, PC (57) ABSTRACT

A teleportation proxy and teleportation proxy service which monitors the usage of a networked computer or terminal to determine contextual metadata for a user reflecting current usage of the networked computer or terminal. A search engine then searches metadata of virtual universe locations in accordance with at least a portion of said contextual metadata and candidate matches are compared against the contextual metadata to determine suggested teleportation destinations in a virtual universe.

21 Claims, 6 Drawing Sheets

(56) References Cited

U.S. PATENT DOCUMENTS

| | | |
|---|---|---|
| 2008/0320041 A1* | 12/2008 | Engelsma et al. ......... 707/104.1 |
| 2009/0037822 A1 | 2/2009 | Kandekar et al. |
| 2009/0055249 A1* | 2/2009 | Lieberman ..................... 705/10 |
| 2009/0100352 A1 | 4/2009 | Huang et al. |
| 2009/0144267 A1 | 6/2009 | Cook et al. |
| 2009/0158161 A1* | 6/2009 | Gibbs et al. .................. 715/733 |
| 2009/0177980 A1* | 7/2009 | Leahy et al. .................. 715/757 |
| 2009/0210301 A1* | 8/2009 | Porter et al. ................... 705/14 |
| 2009/0240659 A1* | 9/2009 | Ganz et al. ...................... 707/3 |
| 2009/0318223 A1 | 12/2009 | Langridge et al. |
| 2010/0083169 A1* | 4/2010 | Athsani et al. ................ 715/810 |
| 2010/0162149 A1* | 6/2010 | Sheleheda et al. ............ 715/764 |
| 2010/0169796 A1* | 7/2010 | Lynk et al. .................... 715/757 |
| 2010/0203952 A1 | 8/2010 | Zalewski |
| 2010/0299618 A1* | 11/2010 | Pare .............................. 715/757 |
| 2011/0047267 A1* | 2/2011 | Syvain et al. ................. 709/224 |
| 2011/0077085 A1 | 3/2011 | Finn et al. |
| 2011/0078170 A1 | 3/2011 | Finn |

OTHER PUBLICATIONS

Various Authors; Wikipedia Article "Spycraft: The Great Game", Aug. 30, 2009 version.

Frank Luna; "Introduction to 3D Game Programming with DirectX 10", copyright 2008 Wordware Publishing, Inc., Sudbury, MA, p. 144.

* cited by examiner

*Figure 5* — WOULD YOU LIKE A TELEPORT SUGGESTION?

ROUTING A TELEPORTATION REQUEST BASED ON COMPATIBILITY WITH USER CONTEXTS

CROSS-REFERENCE TO RELATED APPLICATIONS

This invention is related to a previous invention by the same inventors entitled "Apparatus and Method to Transition Between a Media Presentation and a Virtual Environment," U.S. patent application Ser. No. 12/568,924, filed Sep. 29, 2009, entitled "Apparatus and Method to Transition Between a Media Presentation and a Virtual Environment", the content of which is fully incorporated herein by reference.

FIELD OF THE INVENTION

The present invention generally relates to the production and management of interactive virtual universes presented to users on computers linked by a network and, more particularly, to facilitating teleportation of an avatar to an optimal location within one or more interoperable virtual universes based on current user contexts.

BACKGROUND OF THE INVENTION

Closely following the introduction of computer generated graphic representations of objects, computers games have been developed and have become popular to the point of becoming a significant industry. A significant factor in the continuing popularity of such games may possibly be the fact that the simulated venue or environment in which the game is played is limited only by the imagination of the game developer and can be presented to a viewer on a display with a realistic appearance which is limited only by the hardware and software employed to render associated images. Moreover, such simulated environments may be changed at will and very rapidly with rules of the game often being altered with the simulated environment. Connection of computers through networks such as the Internet have also allowed interactive participation in the same game simultaneously or at will by numerous participants.

As a synthesis of such games with other capabilities of the Internet such as interactive chat rooms, advertising and marketing and access to massive amounts of information and the like, so-called virtual universes (sometimes referred to as "metaverses" or "3D Internet") have been developed and made available to the public in recent years. A virtual universe (VU) is a computer-based simulated environment intended for users thereof (referred to as "residents" or "agents") to inhabit, traverse and interact through the use of avatars. An avatar, in the context of a VU, is a graphical representation of a user which has an appearance that is freely selectable that the user can control and other participants can see, often taking the form of a cartoon-like human which can move through the regions of the virtual universe represented by 3D graphics and landscapes which may or may not resemble the real world in terms of physical laws, building environments, geography and landscapes. Some examples of virtual universes available to the public include Second Life® ("Second Life" is a trademark of Linden Research, Inc. in the United States and/or other countries), Entropia Universe™ ("Entropia Universe" is a trademark of Mindark PE AB in Sweden and/or other countries), and There® ("There" is a trademark of Forterra Systems, Inc. in the United States and/or other countries). Examples of massively multiplayer online games include EverQuest® ("EverQuest" is a trademark of Sony Online Entertainment, LLC in the United States and/or other countries), Ultima Online® ("Ultima Online" is a trademark of Electronic Arts, Inc. in the United States and/or other countries) or World of Warcraft World of Warcraft® ("World of Warcraft" is a trademark of Blizzard Entertainment, Inc. in the United States and/or other countries). Publically available virtual universes and/or massively multiplayer online games are operated by persons or companies who provide servers to generate portions of the VU and which may impose a charge for participation as a resident, to establish a particular object or environment (sometimes referred to as an "island") within the VU, present advertising and the like or combinations thereof. In short, an avatar controlled by a resident can interact with other avatars, objects and portions of the immediate environment of the avatar in much the same way a person would interact with other persons, objects and portions of the environment in the real world but where transportation between portions of the VU may be nearly instantaneous (e.g. referred to as "teleporting") and objects and local environments within the VU may be entirely developed at win to resemble the real world closely, not at all or with any degree of realism or fantasy in between which may be provided by the administrator of the VU or users of the VU, often for a not insubstantial fee. Further, once such objects or local environments become part of a VU, fees can be charged for use made of them through avatars. On the other hand, many entities have found it advantageous to provide environments closely resembling real world facilities or locales to allow users to experience, though avatars and with a significant degree of realism, particular locales in the real world and a sampling of the likely inhabitants thereof. Conversely, a user may wish to interact with a portion of a VU which is compatible with or closely resembles a current user context such as current activity or location.

SUMMARY OF THE INVENTION

The present invention provides an apparatus and method functioning as a teleportation proxy service to track user contexts and search for and suggest to a user locations in one or more virtual universes having maximal compatibility with selected current user contexts.

In order to accomplish these and other objects of the invention, a method of suggesting teleportation destinations which are personalized to a current context of a user is provided comprising collecting contextual metadata related to current usage of a networked computer or terminal by a user, developing a query for a search engine based on the contextual metadata, searching locations of a VU for locations having metadata corresponding to the query to form search results, and suggesting a VU location having metadata corresponding to the contextual metadata as a potential teleportation destination for the user.

In accordance with another aspect of the invention, a computer program product is provided which, when run on a computer, causes the computer to perform steps of collecting contextual metadata related to current usage of a networked computer or terminal by a user, developing a query for a search engine based on the contextual metadata, searching locations of a VU for locations having metadata corresponding to the query to form search results, and suggesting a VU location having metadata corresponding to the contextual metadata as a potential teleportation destination for the user.

in accordance with a further aspect of the invention, an apparatus is provided comprising an arrangement for detecting at least one of a location, a time/date, an activity/event and a person/object in data available to the computer and related to current usage of the networked computer or terminal by a user to form contextual metadata for the user, a memory for storing the contextual metadata, a search engine for searching locations of a VU for locations having metadata corresponding to the contextual metadata to form search results; and an interface for prompting a user to view a suggestion of a VU location having metadata corresponding to the contextual metadata as a potential teleportation destination for the user.

In accordance with yet another aspect of the invention, a teleportation proxy service comprising furnishing use of software to a user of a networked computer or terminal to configure a computer accessible to the networked computer or terminal to provide an arrangement for detecting at least one of a location, a time/date, an activity/event and a person/object in data available to the computer and related to current usage of the networked computer or terminal by a user to form contextual metadata for the user, a memory for storing the contextual metadata; a search engine for searching locations of a VU for locations having metadata corresponding to the contextual metadata to form search results; and an interface for prompting a user to view a suggestion of a VU location having metadata corresponding to the contextual metadata as a potential teleportation destination for the user.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
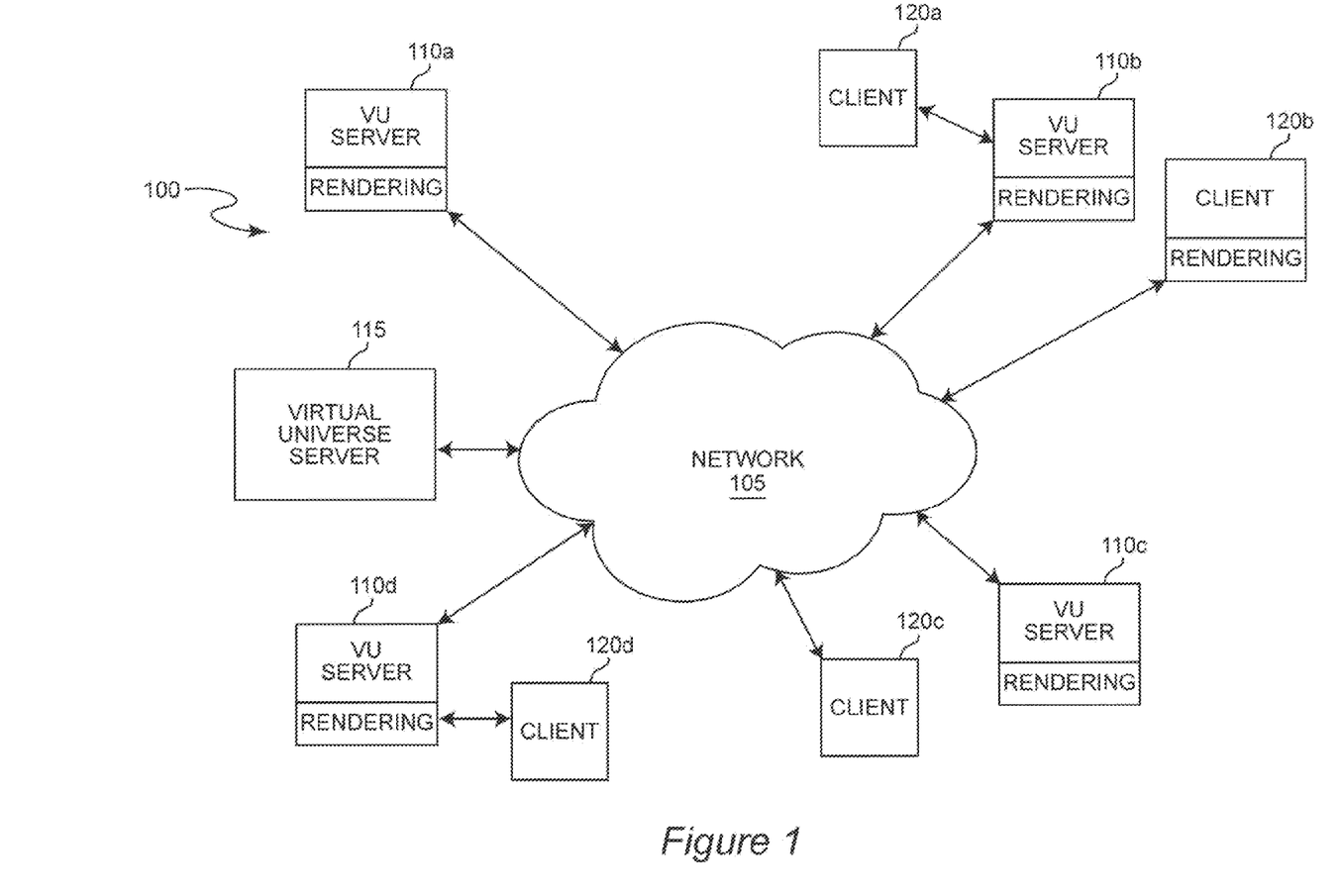
FIG. 1 is a high-level block diagram or data flow diagram of a network-based virtual universe.
Figure 2:
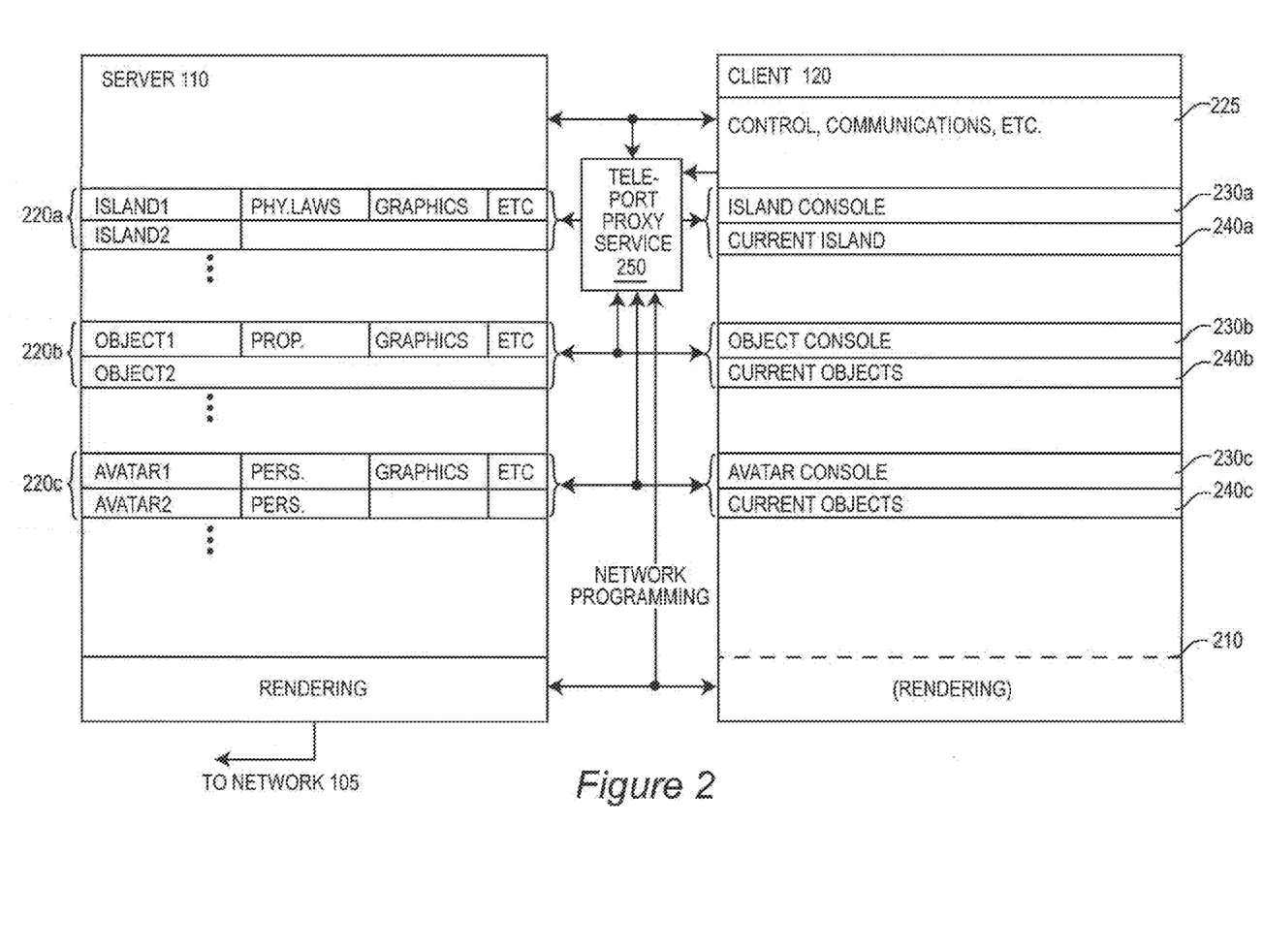
FIG. 2 is a similarly high-level block diagram of some details of the client 120 and server 110 generally provided for participation in a virtual universe.

Referring now to the drawings, and more particularly to FIG. 1, there is shown a high-level diagram of a network implementing a virtual universe (VU). FIG. 2 is a similarly high-level block diagram illustrating functional relationships between a client terminal and a server implementing a VU and between which network 105 may or may not be interposed. FIGS. 1-2 are principally arranged to facilitate an understanding of the overall general operation of a virtual universe and do not and are not intended to represent any particular known implementation of a VU. Further, at the level of abstraction with which a VU is represented in FIG. 1, the VU illustrated may or may not include the invention and no portion of FIG. 1 or 2 is admitted to be prior art in regard to the invention. It should also be borne in mind that VU implementations have become relatively sophisticated and the underlying technology relatively mature such that enhancements thereto, such as those provided by the present invention, must be interoperable with existing network and VU infrastructure and integration of the invention with a VU is generally depicted in FIG. 2.

It should also be recognized that operation of a VU is extremely processing intensive and, while large amounts of computing resources may be accessible through a network, graphics generation and rendering must be distributed and managed in such a way as to provide images of portions of the VU in a very short period of time in order to be acceptable to residents of the VU, particularly in regard to updating views as avatars are manipulated and as teleportations between islands of the VU occur. Further, substantial portions of the control of avatars must be automated in order to keep the manipulation effort required of a resident within reasonable bounds while providing meaningful and reasonably logical and realistic interactions with environments, objects and other avatars. Thus, to reduce the number of avatar control parameters which must be controlled by a user to a practical level, each environment/island, object and avatar must be personalized (e.g. have a personality, properties, including ownership and the like) as well as many properties and attributes (e.g. behaviors and defaults) which must be transmitted efficiently, generally as metadata, between potentially a large number of processors which perform the rendering thereof and the rendering distributed in some form to the terminals through which residents interact with the VU.

Figure 7:
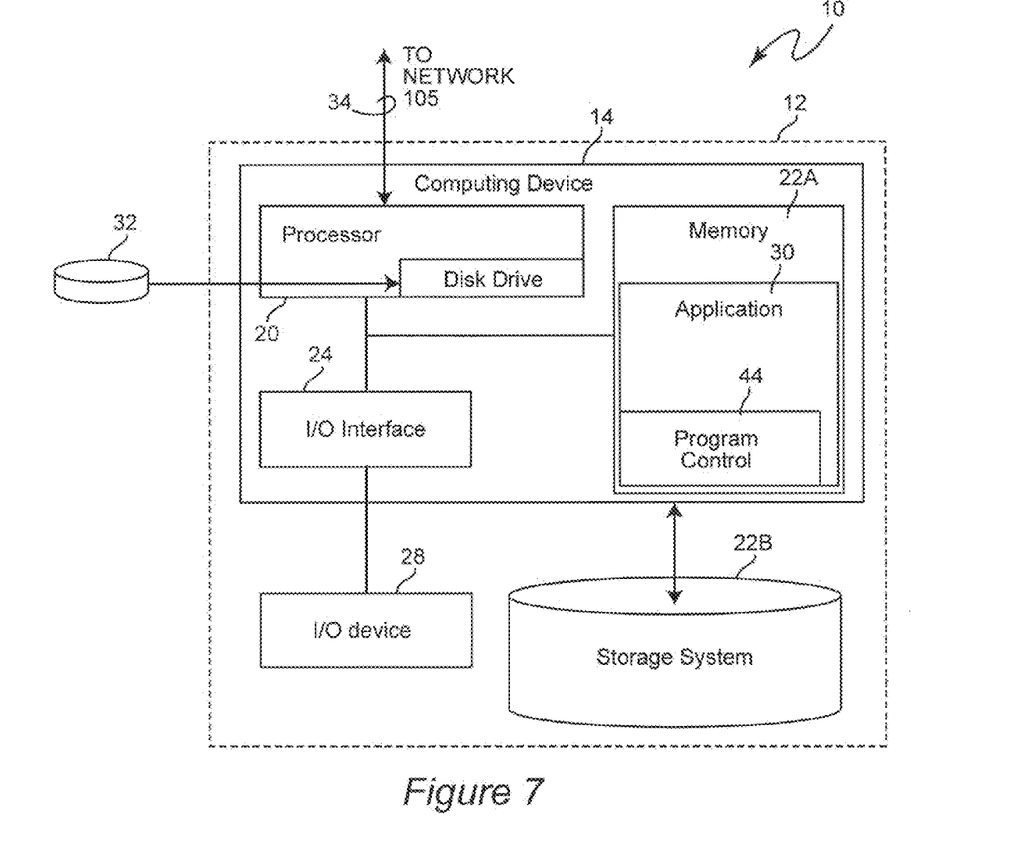
FIG. 7 illustrates a suitable processor architecture for use as a server or client in FIG. 1.

More specifically, as illustrated in FIG. 1, the overall network and system 100 will be recognized as substantially the same as that of the Internet. Other functional elements such as firewalls, proxies and the like may be included for purposes of security, reliability and the like but are not important to the successful practice of the invention. Network 105, such as the Internet, provides communications between all VU servers 110a-110d and at least one virtual universe server 115 which establishes the basic VU topology, characteristics, rules and the like and maintains membership and billing information in regard to residents (users). Clients 120a-120d are essentially user terminals and may communicate with the network 105 and VU server 115 either directly or through a VU server although that distinction is unimportant to the practice of the invention, as well. A suitable processor architecture is illustrated in FIG. 7 and discussed below.

Referring now also to FIG. 2, the nature of communications generally depicted in FIG. 1 will be explained in greater detail but also with a degree of generality since many variations thereof may be employed. It will be readily understood by those skilled in the art that rendering of islands, avatars, objects and the like is perhaps the most processing intensive aspect of a virtual universe as well as being the most time-critical for performance which is acceptable to the user. Hardware, software and firmware for performing rendering is generally resident in each VU server 110 and the virtual universe server 115 of FIG. 1 but may be present to some degree (e.g. a graphics co-processor) at a client terminal 120 as depicted by dashed line 210 and parentheses in FIG. 2. In general, the servers 110, 115 will have the capability of arbitrating the most convenient/available location for rendering to be done most expeditiously. For example, when rendering is required at, for example, client 120a for interaction of a particular avatar with an object while changing location on an island, the rendering (including occlusion or hidden line processing) could be performed at the local server 110b or distributed over any or all of servers 110a-110d and possibly even including some client terminals (e.g. 120b) having rendering capability depending on rendering complexity (e.g. required detail) and current processing loads of VU servers and clients. It should be appreciated that plural avatars for plural residents/users may be present in the same environment and that a different point of view may be required for the rendering presented to each resident/user.

Thus, the graphics to be presented to a user may be transmitted as a rendering to the network or a local client from a server (e.g. as compressed graphics which may or may not be further modified at a local server or client processor) or, if rendering of avatars, objects or islands resident on a particular server are to be rendered on another processor, attributes such as the identity, physical laws, graphics definitions (e.g. primitives), etc. of an island, the identity, properties, graphics definitions; etc. of an object and/or personality, ratings, graphics definitions, etc. of an avatar are stored, preferably as metadata in servers 110 and transmitted as such to the processor(s) which will actually perform the rendering and retransmission of the graphics. It should be appreciated that such attributes will be either constant or only infrequently or slowly changing and thus would be impractical and distracting to specify with each avatar command but can be automatically transmitted and retransmitted between servers, as needed, with avatar commands, controls and/or communications specified by the user/resident.

It should also be appreciated that client 120 will have appropriate controls and communications facilities (which are not generally hardware-dependent but can use available hardware interfaces such as a keyboard, mouse, camera, microphone or the like) collectively depicted at 225 of FIG. 2 which will preferably be resident on the client processor.

In order to create islands, objects and avatars, some arrangement for doing so, preferably a graphic user interface (GUI) which may be in the form of one or more screens (possibly nested) functioning as a console 230*a*-230*c* may also be resident but are preferably downloaded from virtual universe server 115 through the local server. Such consoles allow particular attributes (e.g. locations, properties, personalities, graphics definitions and the like) to be specified and which are thereafter stored, preferably on an associated server 110 as depicted at 220*a*, 220*b* and 220*c* for islands, objects and avatars, respectively. Similar GUIs 240*a*-240*c* are also provided (but preferably resident on the client processor) for control of the current island, object(s) and/or avatar, once it has been created. Suitable arrangements for providing GUIs or consoles 230*a*-230*c* and GUIs 240*a*-240*c* are known and others providing enhanced user/resident convenience is foreseeable. The current island (220*a*) with its associated objects (220*b*) correspond to the current location of the current avatar (220*c*) and are thus the object of teleportation or relocation invitations to which the present invention is directed for management thereof as will now be discussed.

Some definitions which will be helpful in the following discussion are:

1. Avatar—an avatar is a graphical representation the user/resident selects that others can see, often taking the form of a cartoon-like human but which can be produced with any degree of detail, whether realistic or fanciful;

2. Agent—an agent is the user's account, upon which the user/resident can build an avatar and which is tied to an inventory of assets the user creates and/or owns;

3. Region—a region is a virtual area of land (e.g. a portion of an island or an environment associated therewith, such as an interior space in a building) within the virtual universe which typically resides on a single server;

4. Landmarks—a landmark is a map location that can be saved by a user (much in the manner of a "bookmark" in the Internet) and typically comprises a name and a map coordinate within the VU;

5. Friend/contact—a friend or contact is another user/resident of the VU which is maintained in one or more lists which allows a user to see when friends or prior contacts are online and provides a mechanism for contacting them directly using tools available with the list. It should also be appreciated that assets, avatars, the environment corresponding to a location and anything else visible in the virtual environment comprises universal unique identifiers (UUIDs) tied to geometric data (preferably distributed to users as textual coordinates), textures (preferably distributed to users as graphics files such as JPEG 2000 files) and effects data (preferably rendered by the user's client according to the user's preferences and user's device capabilities but could be otherwise rendered as discussed above).

Virtual universes may be traversed by such methods as walking, flying or teleporting. Generally, walking and flying provide for traversal of areas within an island while teleporting provides a mechanism for traveling rapidly from one VU location to another VU location even if the locations are geographically (e.g. in the context of the topology of a particular VU) far apart such as on different islands or even in different virtual universes. As indicated above, a user can teleport to any other location of which he may be aware. However, since a major feature of virtual universes is to allow avatars of different users to interact as well as to increase user awareness of additional locations that may be of interest, one user may issue an invitation to another user in the form of an offer of teleporting an avatar of the recipient from the current location of the recipient's avatar to another location. Known systems allow a recipient to accept or reject the invitation/offer of teleporting. If accepted, the avatar of the recipient is teleported from its current location to a location corresponding to the invitation/offer. In general, principally for convenience of administration (e.g. billing) and security, teleportation is performed based on an invitation which may be accepted or rejected but a user may generally solicit an invitation to any location of which the user may be aware in order to allow the owner of the island to provide promotional information or impose any restrictions on the invitation which must be accepted by a user before the teleportation is carried out. However, for the successful practice of the present invention it is only necessary to understand that some mechanism is provided by the user to request teleportation such as solicitation of an invitation or subscription to a virtual universe providing locations to which teleportation can be performed on request of a user.

Networked computers or computer terminal-like devices (e.g. a television interface accessory having a keyboard and possibly other user input devices) are commonly used for a variety of activities such as research or communication and including entertainment as well by receiving video presentations as streaming video and audio programming or accessing virtual universes and video games. A user may thus switch between such functions at will and may even perform some or all of these activities concurrently.

For example, a user may be watching a movie or preparing a document on a subject having to do with a particular location and/or time period and wish to virtually experience a particular location in an interactive manner. For example, an author using a word processor may be composing a novel or dramatic work involving a particular location and wish to observe a virtual experience of his avatar "walking through" a particular scene at a particular time in that or a similar location. Similarly, a user at a particular location may wish to have a virtual experience of some facility or attraction in the area or the general environment of that location such as making a virtual visit to a local amusement park or restaurant at the current or another time such as a different season (or even to experience current traffic conditions) to determine if an actual activity or visit to such a site at a particular time is or would be desirable. Likewise, a user already having an avatar at a location in a VU having particular characteristics may wish to visit other locations in the same or another interoperable VU having similar characteristics in order to determine which island may be most conducive to the desired virtual experience. It is easily foreseeable that interoperable virtual universes will exist in the future and that it is very likely that different virtual universes will have islands having very similar characteristics. It is also very possible that, due to network traffic conditions and varying processing loads, avatar crowding and the like at locations in a given virtual universe, that very different VU experiences may be derived from differing conditions such as avatar usage at virtually identical islands existing on different virtual universes at a given time.

For example, a virtual park or other type of facility may be provided on several virtual universes and one may be crowded (or have longer response times, different quality graphics or the like) while another, substantially duplicate location may not (or provide better service, rendering or the like). Currently no facility exists to even inform a user of the existence of parallel or otherwise contextually related locations on the same or other interoperable virtual universes; the likelihood of which will almost necessarily increase in the future. Actually finding and carrying out teleportation to a contextually related location, particularly one which the user may consider to be ideal can be a complex and frustrating experience and certainly, at a minimum, presents a substantial distraction to the user who may, for example, merely wish to have a brief virtual experience with a real object or person known to be present at a given time in a real location but not knowing if a corresponding virtual location exists on a VU which can be accessed or whether or not the object of interest will be present at such a virtual location, if any. At present, a user must rely on "word-of-mouth" information, published lists of locations (in which detail is likely to be very limited) or simply experimenting with different virtual universes. At the present state of the art, suggestion of appropriate teleportation destinations is generally limited to paid sponsorships of VU destinations or by analysis of actions of the user's avatar within a VU to determine the user's implied interests for selecting a destination for suggestion. In other words, virtual universe systems currently available do not even possess the facility for obtaining information to make suggestions likely to be appropriate to a user (as distinct from the user's avatar) in any of the scenarios alluded to above since they do not and cannot consider the context of the user's current activities within or apart from a VU.

To facilitate such a contextually related virtual experience, the invention is preferably embodied as a teleportation proxy service 250 that routes (or makes a suggestion to route) the user to the most appropriate VU and location therein based on the user's (as opposed to the avatar's) current circumstances or context, including but not limited to the user's environment, location and current activities, whether or not those activities involve a VU location. By thus personalizing the selection of VU and location therein to a current or recent context of a user, either automatically or responsive to user request for a suggestion, the user is able to have a more favorable VU experience while minimizing effort and distraction which may be currently involved in locating an appropriate teleportation destination having suitable or best contextual compatibility or relevance.

In FIG. 2, teleportation proxy service 250 is depicted as functionally located between a client terminal 120 and a server 110. It is to be understood, however, that server 110 need not be topologically or physically adjacent the client in the network but could be associated with any networked server or even contained in any client, including the user's terminal. The depiction of FIG. 2 such that the proxy is conveniently located, logically, such that it can receive input information directly from the client control, communications and inputs while being interposed in VU location communications between the client and server in order to bidirectionally communicate with both as well as to receive avatar and object information communicated incident to operation of the VU system in regard to client 110. Such a functional location also is preferred for allowing the invention to operate in the "background" as a proxy service to monitor user activities and search virtual universes for locations and/or objects relevant to the user activities. These communication links are collectively depicted in FIG. 3A (e.g. between client CPU 216 and connection 310' to network 105 and which could be merged with connection 310 through the client CPU if desired).

Figure 3A:
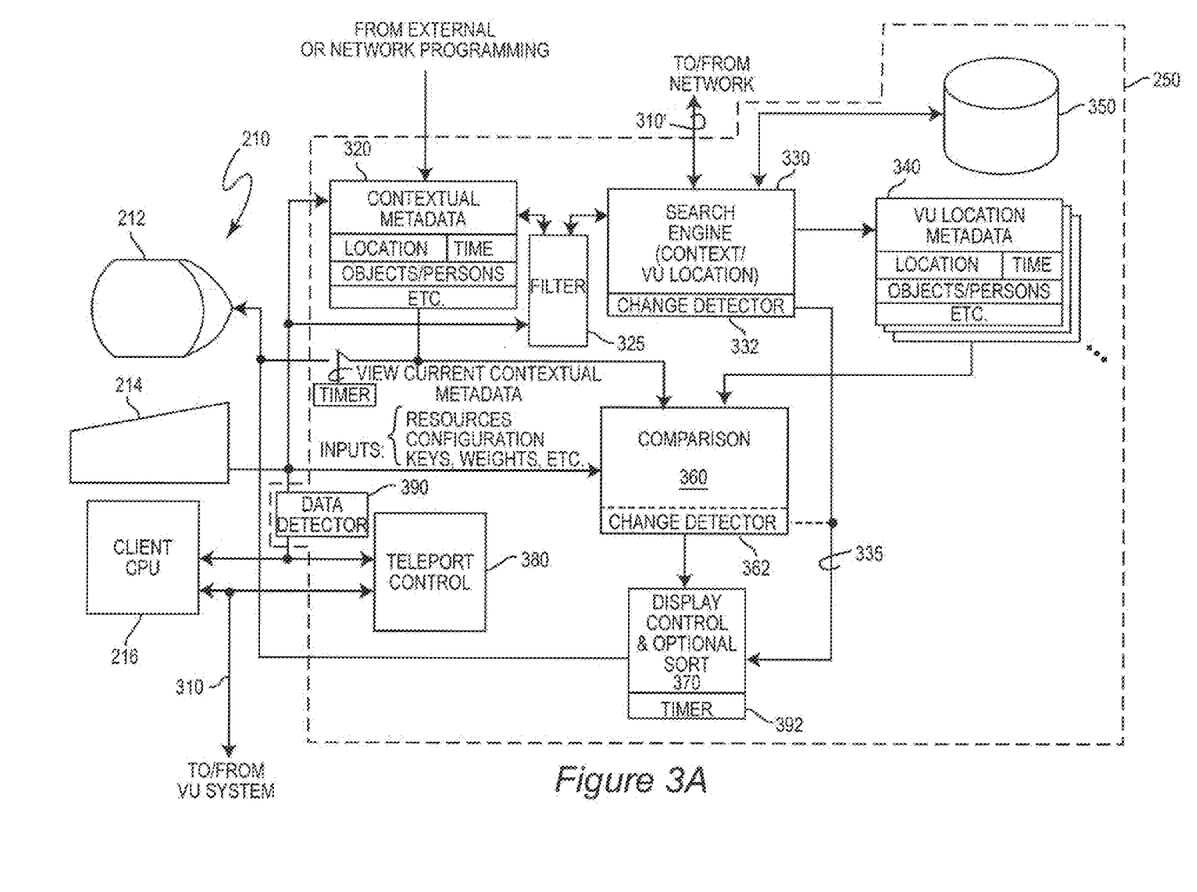
FIG. 3A is a high-level block diagram or data flow diagram of user controls and a proxy service in accordance with the invention

Referring now to FIG. 3A, a preferred architecture for teleportation proxy service 250 will now be explained. It should be borne in mind in the following discussion that the three scenarios in which a user may employ the invention to substantial advantage and convenience are not only exemplary but quite different and accommodated in much different ways. However, the hardware/software facilities and resources involved in all three can be viewed as very similar with only relatively slight operational differences employed in each of the respective scenarios. Therefore, FIG. 3A is arranged to facilitate an understanding of the basic principles of the invention supporting substantial flexibility of application to such scenarios and variations thereon as well as depicting a preferred architecture by which substantial economies may be realized.

In this regard, it may be helpful to note that the three scenarios discussed above differ principally in whether or not contextual metadata 230 is available from the user's current activities in connection with terminal 210 and/or how it is obtained. In general, metadata suitable for practice of the invention and examples of its potential sources are as follows:

| Contextual metadata | Potential sources |
|---|---|
| User Location | User-set system preferences |
|  | Network communication routing |
|  | VU location metadata |
| Date | Current Date |
|  | Programming metadata |
|  | User-set Date |
|  | VU location date metadata |
| Activities | Current user activities |
|  | Metadata re: activities available at location (may be from external network site) |
|  | User-set system preferences |
|  | VU location metadata |
| Objects/persons | User-set system preferences |
|  | Programming metadata |
|  | VU location metadata |

The appropriate choice of potential sources of the metadata should be arranged on the basis of the current interaction of the user with the client terminal 120 and control of inquiries to search engine 330, as needed. In general, it is desirable to provide for collection and storage at 320 of at least the four types of contextual metadata noted above. However, more types of metadata could be monitored and/or any or all of the above types of metadata could be subdivided for any desired degree of detail to refine the search query and data involved in user activity monitored or parsed for information appropriate to each type of contextual metadata. When any such data is encountered, the contextual metadata stored at 320 is updated (or possibly deleted after a given period of a type of contextual metadata remaining unchanged) to form a changed combination of metadata. A search can then be initiated from search engine 330 and suggestions made to the user when found. It should be noted in this regard, that the teleportation proxy service 250 in accordance with the invention performs searches autonomously and prospectively as the contextual metadata changes and effectively announces the availability of a suggestion. Therefore, regardless of the duration of the search, a suggestion matched to the current context of the user will be available for a teleportation request to be immediately made and an invitation issued when the user becomes aware that such a destination exists. Therefore any delay or latency in the teleportation proxy service 250 and any communication delays that may be encountered in the search are made completely transparent to the user.

To obtain the best match(es), it is generally desirable to maintain contextual metadata of all of the types for which provision is made such as the four exemplary types of location, data/time, activities/events and persons/objects enumerated above. On the other hand, searching on fewer types of contextual metadata will have the effect of broadening the search as may be very appropriate or desirable if one or mere types of contextual metadata remains unchanged for an extended period of time; allowing the inference that such a portion of the user context has possibly become less relevant to the current context of the user and a broader search may be appropriate.

Thus, if a user is watching programming (or possibly writing text, using a word processor) about natural disasters (or virtually experiencing one in a particular VU location and the San Francisco earthquake began to be discussed (or virtually experienced), the text, VU location or programming metadata might be detected by detector 390 as, for example, "425 Market St., San Francisco, Calif., 1906" which would be parsed using well known analysis techniques not critical to the practice of the invention to find a location, time and event (but not necessarily persons or objects) which are entered at 320 as contextual metadata for the user. Entry of such contextual metadata will be presumably detected as a change therein and a search initiated. Thus, after filtering 325, search engine 330 would assemble a query of the form:

Location: 425 Market Street San Francisco, Calif.
Time: 1906
Event: San Francisco earthquake and conduct a search of available and interoperable virtual universes and return locations therein which match some or all of the contextual metadata represented in the query. As alluded to above, more than one potentially identical location could be returned and the user could then select between them. (It should be noted that if the user's avatar is already in such a location of a particular VU, such a search would have been done incident to the prior teleportation to that location and which would have caused a change in the user's contextual metadata. Thus, any alternative destinations also meeting the search query in whole or in part would already have been returned and available to provide one or more choices to the user.) As noted above, other types of contextual metadata (either captured or inferred) could be used as determinants to help identify an appropriate VU and location therein such as the user's current location, best networking route, the user's active VU subscriptions and the like, for example, to provide the most suitable service.

As noted above, if the user is already in a VU, the user may want to view (or experience) the same location at another time which the user could enter in any of a variety of ways such as dialog boxes or screens as will be discussed below or which the invention could capture or infer. That difference in time (or any other contextual metadata type would also represent a change in the contextual metadata stored at 320 and a further search performed using the existing location. In such a case, the search engine 330 would return data that matched the location and time and effectively ignore the event since "San Francisco earthquake" would not be matched at another time and thus the best match(es) would be likely to only match the location and date. (In theory, a VU location presenting another earthquake in San Francisco at the specified date/time could exist and, in such a case, would be returned unless the user's contextual metadata excluded fictional or fantasy events.) On the other hand, however, the event contextual metadata could also be changed along with or instead of changing the date so that the search would result in a return of one or more VU locations corresponding to the specified event (e.g. a street race or a game based thereon) but still in San Francisco. From there, the contextual metadata could be further changed by any of the facilities or circumstances alluded to above, to change, for example, the location contextual metadata to find one or more different VU locations having the same activity on the closest date but in a different location (e.g. Monte Carlo).

Figure 3B:
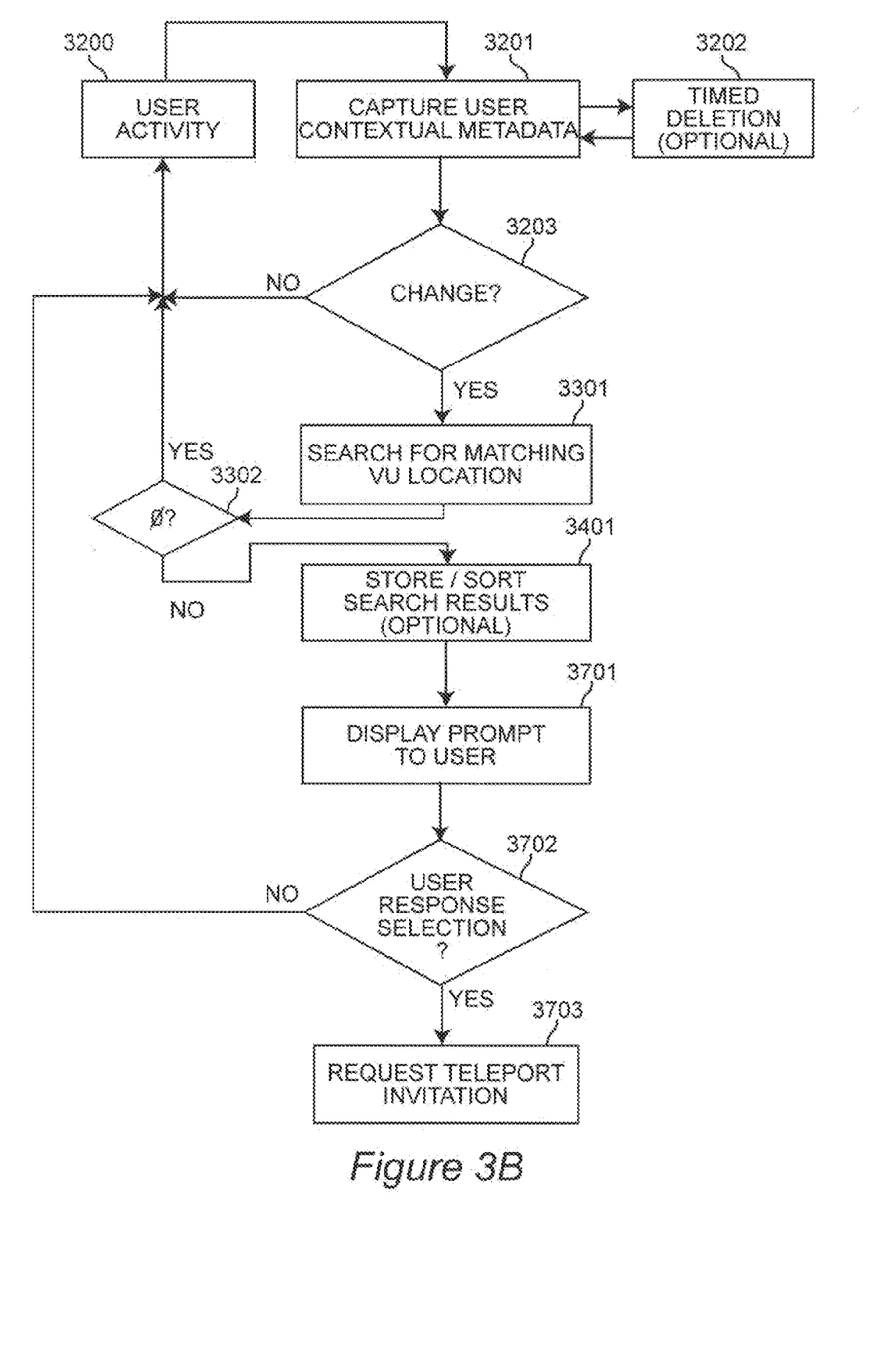
FIG. 3B is a flow chart illustrating operation of the invention.

More specifically and with reference now to FIG. 3B, in the first scenario, where the user may be passively watching some network programming or actively performing some other operations such as composition of a document, the contextual metadata may be derived from the metadata of the program being watched (e.g. from the network or a local digital video disc (DVD) or the like) or the other operations being performed such as words in a document being composed that may be recognized as a location; date or object likely to have a counterpart in a VU. In the second scenario, metadata cannot be derived in such a fashion but must be derived from a search on the network using search engine 330 based on the user location which search engine 330 may also discover through network operations and infrastructure. In the third scenario, contextual metadata is necessarily available from the VU system currently in operation. The user activity in each of these scenarios is collectively depicted at 3200 of FIG. 3B. The operation of the invention does not begin until contextual metadata is detected and captured as depicted at 3201. Detection may be achieved, for example, by comparison with existing metadata terms existing for locations on a VU or in any number of parsing techniques known in the art or foreseeable (e.g. four-digit numbers or numbers separated by colons are presumably dates and times, locations and events/activities are likely to be capitalized, etc.). Timed deletion of contextual metadata 3202 may optionally be performed as alluded to above. Contextual metadata captured may also be duplicative of contextual metadata previously captured. Therefore, the operation of the invention may begin when contextual metadata is captured from the user activity but the operation simply loops until a change in contextual metadata is detected as depicted at 3203, whereupon a search 3301 for a VU location match some or all of the user's contextual metadata is initiated. Again, no action is taken until a changed result of the search is returned and detected at 3302 and the process continues to loop through the steps and operations as described above until such detection occurs. Changed results that are returned are preferably communicated as depicted at 335 of FIG. 3A and stored and may optionally be sorted as depicted at 340 and 360/370 of FIG. 3A and 3401 of FIG. 3B. Up to this point in the operation of the invention, the operations of the invention are entirely transparent to the user. Thus the operation of the invention is wholly non-intrusive until a reasonably well-matched suggestion and possibly a plurality thereof have been accumulated and are ready to be used. A prompt can then be generated at display control 370 displayed to the user (3701) but no further action is taken until the user responds (3702) with an authorization to proceed or a selection from among accumulated suggestions, whereupon a teleport invitation can be requested or teleportation directly undertaken through teleport control 380, depending upon the protocol of the VU.

Returning to FIG. 3A, the user terminal 210 will typically comprise a display 212, one or more input devices collectively depicted at 214 and a central processing unit (CPU) 216; particulars of which are not important to the practice of the invention but the configuration and hardware resources included therein may be considered during operation of the invention as will be discussed below. Operation of the constituent elements of the user terminal are well-understood in the art, including use for network communications and participation in a VU over network connection 310 and 310'. User terminal 210 communicates directly with the teleportation proxy 250 which is preferably transparent to the user and in an active or stand-by state although some feature may be provided such as a so-called hot key or an icon (e.g. in a tool bar) to enable or disable the teleportation proxy. In such a case, when disabled, the teleportation proxy service 250 would simply allow normal communications to pass through it, if necessary, while, when enabled, it can autonomously conduct its own communications with the network to obtain and, if desired, store information upon which it operates discussed above. In any case, some network communications can and preferably should be conducted directly with the network, as depicted at 310' for clarity, regardless of the state of the teleportation proxy service in accordance with the invention such as searching communication links to determine the physical location of the user.

The teleportation proxy service 250, itself, preferably includes a memory or storage area 320 to hold current contextual metadata for the user and one or more memories or storage areas 340 to store corresponding data concerning particular VU locations derived through a search performed by search engine 330. To enhance speed of response, it may be desirable to accumulate VU location metadata in a database 350 associated with the user terminal 210 since users of a given terminal 210 are likely to be more frequently interested in some types of VU locations than others and VU location metadata, if kept current, may be accessible more rapidly from database 350 with much less search processing overhead and a smaller database, possibly even in a content-addressable fashion, than from a search conducted by search engine 330 over all extant VU locations.

It is preferred to provide all of the elements of the teleportation proxy service 250 by downloading software as a computer program product which configures CPU 216 into such functional elements. Doing so allows the service to be provided to the user by subscription or otherwise marketed to VU users. Thus FIG. 3A can also be understood as a data flow diagram depicting the methodology of the invention.

When data is present in both contextual data storage 320 and VU location metadata storage 340, a comparison can be performed based oh the content thereof and the quality of the match, if any, discovered thereby can be rated and optionally sorted (at 370) and the results displayed under control of display control 370 or otherwise provided to the user upon request, periodically or upon detection of change of metadata stored at 320 and/or 340, as depicted at 332 or 362, or user comparison criteria, such as minimum degree of successful comparison, as teleport invitations from which a selection can be made by the user, upon request from the user. If, under the conditions of one or more of the above three scenarios, contextual metadata is not available, search engine 330 preferably searches for and captures such information from the network as alluded to above. Otherwise the search engine preferably functions as an agent to continually (as network traffic permits upon detection of a change in contextual metadata of the user) search the network and VU systems accessible therethrough to obtain VU location metadata which matches at least some of the contextual metadata 320 to maintain stored VU location metadata as current as possible.

In this regard, it should be noted that it is deemed preferable to filter some of the contextual metadata, as depicted at 325, such that less than all contextual metadata that might be available for comparison 360 is available to the search engine for conducting a search. By doing so, communication of information the user may consider to be sensitive such as demographic or personal location information may be prevented from being transmitted over the network, particularly if the search engine is provided as a distributed resource and not wholly contained within the client CPU (as is likely to be the case) to avoid a need to periodically poll all VU systems and locations to obtain current VU location metadata. It can be readily understood that such polling would rapidly become prohibitive in regard to communication link overhead as VU locations and VU systems as well as VU system users proliferate. Thus it is preferred that search engine 330 simply operate to obtain contextual metadata 320, if needed, and to seek matches to as much of the contextual metadata as is made available at the will of the user using filter 325, store the potential matches (possibly with expiration times/dates) and periodically update only the matches that are stored and which match current contextual metadata. It may also be useful in this regard for the search engine 330 to be periodically operated to search for VU locations which have metadata of certain categories such as being modeled on real world locations or having particular physics engines (e.g. that apply particular real or fanciful physical laws to the behaviors and properties of objects) and effectively assemble one or more catalogs of such VU locations.

In operation, contextual metadata can usually be easily derived from the activity of the user of terminal 210. If, for example, the user is passively viewing network programming or an external source such as a local or remote DVD, that programming itself will, if recently created, normally be tagged with metadata about location, time period, subject, objects or persons depicted therein and the like either for the complete program or individual scenes or time periods therein. Such data may be, for example, of the form:

```
<movie type>documentary</movie type>
<time in movie>0:23:00<\time in movie>
<subject>pyramids</subject>
<location>Egypt</location>
<time period>3000 BC - 2000BC</time period>
``` which the search engine can then attempt to match, preferably using fuzzy logic (which is well-understood in the art) to detect good matches between data which inexactly matches. Such tags can be provided by the creator of the program, by viewer comments or from other data sources such as statistical analyses of success of suggestions previously made in accordance with the invention to the same user or other users.

It is also possible to draw some inferences from particular metadata or combinations thereof such as seeking more realistic VU locations for more realistically portrayed programming such as documentaries particularly where objects are shown in close detail and high interactivity is likely to be desired in a VU location, more fanciful VU locations for fictional/fantasy programming and the like (e.g. science fiction) or VU locations having a "look-and-feel" similar to the programming (e.g. animated programs). Conversely, other inferences that may be drawn from the metadata of programming may indicate an incompatibility or particular desirability of some processing provided at a VU location such as a physics engine imposing fictional physical laws and providing rapidly moving action may not be appropriate for a match to documentary programming but very desirable as a match to a science fiction movie.

While such data is provided in most currently produced programming and some standardization of format is occurring in the industry, it may be necessary to provide some format conversion of such data or provide for tagging the programming in an understandable format. Such metadata will necessarily be available from the VU system location environment for the third scenario alluded to above where the user's avatar is already in the environment of a VU location. In this case, metadata concerning physics engine compatibility and hardware sufficiency at the user/client terminal for interaction with the environment should also preferably be included in the contextual metadata. That is, if the user's computing environment in terms of clock speed and available memory is limited, such limitations should also be reflected in contextual metadata so that VU location requirements for local processing may be considered in searching for matching VU locations. Such metadata from a VU location may be similar to:

```
<VU>Some VU</VU>
<location name>Some location</location name>
<VU Physics engine>
<name>Some physics engine</name>
<gravity>real-world</gravity>
<VU Physics engine>
<processor>1.75GHzPentium</processor>
<RAM>1G</RAM>
<coordinates>245,568</coordinates>
```

The service identifies the user's current context.

Figure 4:
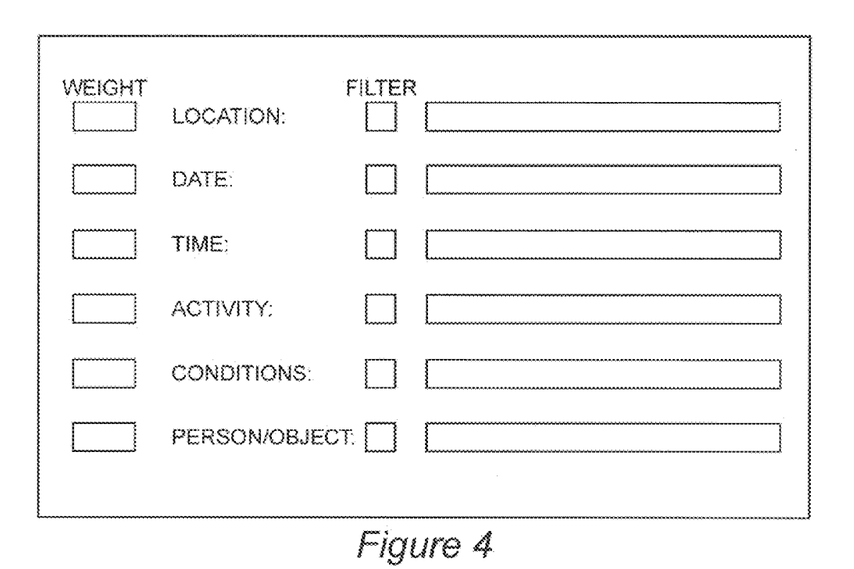
FIGS. 4, 5 and 6 are exemplary screens or dialog boxes suitable for practice of the invention.

If such metadata is not available from a programming source or from a VU location currently being visited by a user's avatar, such as when a word processor is in use to compose a document, as alluded to above, certain metadata may be directly entered or excerpted from the document such as by block transfer to storage area 320 using a contextual metadata screen such as that depicted in FIG. 4. Such a contextual metadata screen preferably mirrors the format and content of storage area 320 and can also advantageously and conveniently be used to input settings for filter 325, alluded to above, or otherwise edit current contextual metadata and, in any case, is preferably invoked from a periodically displayed dialog box or constantly displayed icon.

Alternatively, if the user activity does not correlate with any particular location or time or the user does not wish to make such a correlation to be considered in a search and resultant suggested teleport destination, a preferred default is the user's current location or most frequently or recently used location (e.g. the user's hometown) which can be readily determined by search engine 330 (also performing a default operation when no contextual metadata is available at any given time) from internet routing information and locally stored. When the location has been determined by the search engine and entered into contextual metadata area 320, the search engine is preferably given a further network inquiry to determine activities or circumstances (e.g. conditions such as weather and traffic) which may be available in the vicinity of that location (as reported, for example, on web sites of broadcast radio and television stations, visitor's bureaus, chambers of commerce and the like) which, once found, can also be entered into storage area 320 for purposes of a search of VU locations by search engine 330. Therefore, at least a location should always be available in contextual metadata storage area 320 for comparison at 360 with search results returned by search engine 330 stored at 340 when the user is provided with an option to teleport to a contextually best-matched location while additional information which may be advantageously used in searches of VU locations for contextually similar locations can normally be derived therefrom.

To provide for such a user choice in a non-intrusive manner as well as to limit communication overhead imposed by search engine 330, it is preferred to provide for search engine 330 to have the capability to detect changes in contextual metadata 320, as depicted at 332. Of course, other expedients to provide such an indication will be apparent to those skilled in the art such as simply detecting a storage operation at memory or storage area 320 and/or a change in settings at filter 325. Such a change detector could also be provided for comparison 360 since, as a perfecting feature of the invention not necessary to operation of the invention in accordance with its basic principles, it is preferred to allow the user to not only edit contextual metadata 320 but also to assign weights to the particular metadata matched and the quality of the match (e.g. exact, fuzzy or tenuous) from the metadata screen alluded to above. When such a change is detected, operation of search engine 330 to find other matches is initiated and new information will be stored at memory or storage area 340 and/or 320 and further comparisons and sorting of results made at 370. Detection of a change in weight settings may result in a different result of sorting at 370 and provide a different result which the user may wish to view.

Figure 5:
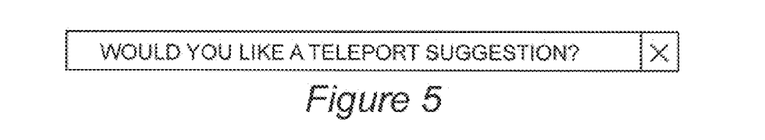
Figure 6:
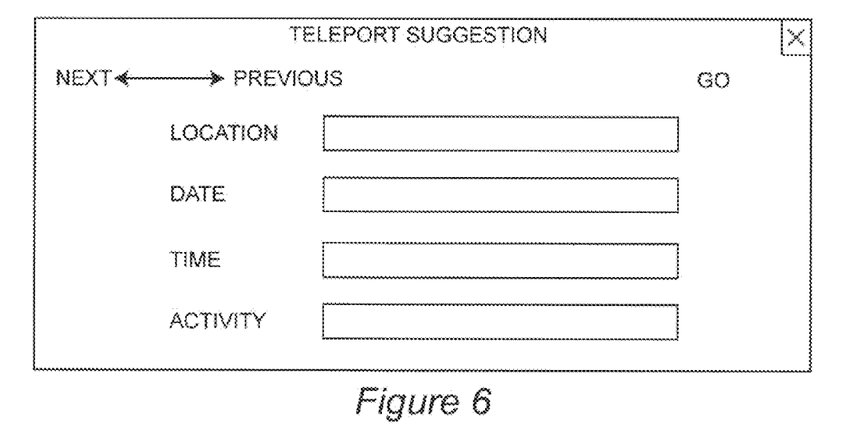

Subsequent to such search and processing or even while such processing is being performed, the sort logic 370 can send a message to be displayed, preferably, as depicted in FIG. 5, as a small dialog box or hot key, to ask the user if a teleport suggestion is desired. Such a message can also be sent periodically at time intervals controllable by the user through setting of timer 392 to limit intrusiveness to an acceptable level. If the user responds to the message, it is deemed preferable to present the results of the search, comparison and sort to the user to identify the site and display some or all of the VU location metadata 340 for the suggested destination in a form similar to that of FIG. 6. An option to view alternative locations at various positions in the sort order (e.g. next/previous) is preferably provided along with an identification of the VU system and location for the information of the user as well as a control for immediately initiating teleportation to the currently suggested location.

Thus it is seen that the invention provides a simple and straightforward methodology and apparatus for determining the context of a user (as distinct from the user's avatar) while searching the network as necessary for suitable and relevant data that can be used as contextual metadata, if needed, searching for corresponding VU locations, possibly over multiple interoperable VU systems, and presenting them to a user as a personalized and contextually appropriate/consistent suggestion for a teleportation destination in a non-intrusive and user-friendly manner which allows not only an enhanced VU experience but integration of use of a VU location with any other activity or activities on a particular computer or client terminal.

The preferred embodiment of the invention as described above can be made more complex within the basic principles of the invention to provide greater functionality as may be deemed desirable or further perfecting features which are particularly preferred and described above such as local storage of search results and an evaluation and sorting thereof for presentation to a user, with or without weighting to reflect preferences of the user in such evaluation and which will become apparent to those skilled in the art in view of the above description of the invention. By the same token, it will be recognized by those skilled in the art that the invention can be successfully practiced and its principal meritorious effects achieved more simply by omitting storage 340, 350, comparison 360 and sorting (as an incident of display control 370 or similar modification) and simply displaying candidate matches to contextual metadata as they are found by search engine 330. A reduction in response speed and some reduction in user interaction would be expected from such a simplified embodiment but a contextually personalized suggestion of a teleportation destination for the user (as distinct from the user's avatar) would still be provided; a function not available from known VU systems.

While shown and described herein as a method, and a system, it is understood that the invention further provides various alternative embodiments. For example, in one embodiment shown in FIG. 7, the invention provides a computer-readable/useable medium 22B that includes computer program code to enable a computer infrastructure to automatically manage teleportation movements between locations in virtual environments while determining suitability of requested destinations. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc., collectively depicted at 32), or on one or more data storage portions of a computing device, such as the memory 22A and/or the storage system 22B (e.g., a fixed disk, a read-only memory, a random access memory, a cache memory, etc.), and/or as a data signal 34 (e.g., a propagated signal) traveling over a network 105 as depicted in FIG. 1 (e.g., during a wired/wireless electronic distribution of the program code).

Still yet, computer infrastructure 10 is intended to demonstrate that some or all of the components of implementation could be deployed, managed, serviced, etc. by a service provider who offers to implement, deploy, and/or perform the functions of the present invention for automatically managing teleportation movements between locations in virtual environments while determining suitability of requested destinations, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure 12 including computing device 14, such as the computer infrastructure 10 that performs the process steps of the invention for automatically manage teleportation movements between locations in virtual environments while determining suitability of requested destinations, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of an application 30 comprising a set of instructions including program control 44 intended to cause a computing device 20 having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver 24 for a particular computing and/or I/O device 28, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

While the invention has been described in terms of a single preferred embodiment, those skilled in the art will recognize that the invention can be practiced with modification within the spirit and scope of the appended claims.

What is claimed is:

1. A method of suggesting teleportation destinations in one or more virtual universes (VU) which are personalized to a current context of a user, the method comprising:

collecting current contextual metadata corresponding to at least one of a location, a time/date, an activity/event and a person/object and wherein said contextual metadata is related to a current island or VU of an avatar of said user, wherein said contextual metadata comprises information corresponding to the current context or circumstances of current usage of a computer or terminal by said user in regard to said at least one of said location, time/date, activity/event and/a person/object and excludes terms derived from a query or communication using said computer;

developing a search query for a search engine based on said current contextual metadata;

when a change occurs in said contextual metadata collected in said collecting step, developing a new search query and searching for VU locations having metadata corresponding to said new search query to form search results; and responsive to said forming of search results based on said new search query, suggesting one or more VU locations having metadata corresponding to a portion of said current contextual metadata based on said search results as a potential teleportation destination for an avatar corresponding to said user into said VU location, wherein the one or more VU locations are in one or more alternative islands or VUs offering a similar or same virtual experience of said current island or VU in terms of setting, whereby suggestions of potential teleportation destinations related to said current context and circumstances of computer usage by said user are made to said user transparently.

2. The method as recited in claim 1, further including:
filtering said contextual metadata collected in said collecting step to form filtered metadata wherein said search query is developed from said filtered metadata.

3. The method as recited in claim 1, wherein said collecting includes searching a network to determine a location of a user.

4. The method as recited in claim 1, further comprising:
sorting locations resulting from said searching.

5. The method as recited in claim 4, wherein weights are applied to said search results to prioritize said sorting.

6. A computer program product for suggesting teleportation destinations in one or more virtual universes (VU) which are consistent with current user context comprising a computer readable medium storing non-transitory signals for causing a digital data processor to perform steps of:
collecting current contextual metadata corresponding to at least one of a location, a time/date, an activity/event and a person/object and wherein said contextual metadata is related to a current island or VU of an avatar of said user, wherein said contextual metadata comprises information corresponding to the current context or circumstances of current usage of a computer or terminal by said user in regard to said at least one of said location, time/date, activity/event and/a person/object and excludes terms derived from a query or communication using said computer;
developing a search query for a search engine based on said current contextual metadata;
when a change occurs in said contextual metadata collected in said collecting step, developing a new search query and searching for VU locations having metadata corresponding to said new search query to form search results; and
responsive to said forming of search results based on said new search query, suggesting one or more VU locations having metadata corresponding to a portion of said current contextual metadata based on said search results as a potential teleportation destination for an avatar corresponding to said user into said VU location, wherein the one or more VU locations are in one or more alternative islands or VUs offering a similar or same virtual experience of said current island or VU in terms of setting, whereby suggestions of potential teleportation destinations related to said current context and circumstances of computer usage by said user are made to said user transparently.

7. The computer program product as recited in claim 6, further including signals for performing steps of:
filtering said contextual metadata collected in said collecting step to form filtered metadata wherein said search query is developed from said filtered metadata.

8. The computer program product as recited in claim 6, wherein said collecting includes searching a network to determine a location of a user.

9. The computer program product as recited in claim 6, further comprising signal for performing a step of:
sorting locations resulting from said searching.

10. The computer program product as recited in claim 9, wherein weights are applied to said search results to prioritize said sorting.

11. Apparatus for providing suggestions of virtual universe (VU) locations to a user of a networked computer or terminal wherein said suggestions are consistent with current usage of said networked computer or terminal, said apparatus comprising:
a detector to detect at least one of a location, a time/date, an activity/event and a person/object in data available to said networked computer or terminal and related to a current island or VU of an avatar of said user to form contextual metadata for said user, wherein said contextual metadata comprises information corresponding to the current context or circumstances of current usage of a computer or terminal by said user corresponding to said at least one of a location, a time/date, an activity/event and a person/object detected by said detector and excludes terms derived from queries or communications using said computer;
a memory for storing said contextual metadata;
a search engine for searching for VU locations having metadata corresponding to a portion of said contextual metadata upon detection of a current change in said contextual metadata to form search results; and
an interface, responsive to said forming of search results based on said new search query, for prompting a user to view a suggestion of one or more VU locations having metadata corresponding to said contextual metadata based on said search results as a potential teleportation destination for an avatar corresponding to said user into said VU location, wherein the one or more VU locations are in one or more alternative islands or VUs offering a similar or same virtual experience of said current island or VU in terms of setting, whereby suggestions of potential teleportation destinations related to said current context and circumstances of computer usage by said user are made to said user transparently.

12. Apparatus as recited in claim 11, further including:
a filter interposed between said memory and said search engine to prevent selected contextual metadata from reaching said search engine.

13. Apparatus as recited in claim 11, further comprising:
a comparator for comparing said contextual metadata and said search results.

14. Apparatus as recited in claim 11, further comprising:
a further memory for storing said search results.

15. Apparatus as recited in claim 11, further comprising
a display control to sort said search results based upon quality of match to said contextual metadata.

16. A teleportation proxy service comprising furnishing use of software to a user of a networked computer or terminal participating in a virtual universe system to configure a computer accessible to said networked computer or terminal to provide:
a detector to detect at least one of a location, a time/date, an activity/event and a person/object in data available to said networked computer or terminal and related to a current island or VU of an avatar of said user to form contextual metadata for said user, wherein said contextual metadata comprises information corresponding to the current context or circumstances of current usage of a computer or terminal by the user in regard to said at least one of said location, time/date, activity/event and/a person/object and excludes terms derived from a query or communication using said computer;
a memory for storing said contextual metadata;
a search engine for searching for VU locations having metadata corresponding to a portion of said contextual metadata upon detection of a current change in said contextual metadata to form search results; and
an interface, responsive to said forming of search results based on said new search query, for prompting a user to view a suggestion of one or more VU locations having metadata corresponding to said contextual metadata based on said search results as a potential teleportation destination for an avatar corresponding to said user into said VU location, wherein the one or more VU locations are in one or more alternative islands or VUs offering a similar or same virtual experience of said current island or VU in terms of setting, whereby suggestions of potential teleportation destinations related to said current context and circumstances of computer usage by said user are made to said user transparently.

17. A teleportation proxy service as recited in claim 16, wherein said software further configures said computer to provide:
   a filter interposed between said memory and said search engine to prevent selected contextual metadata from reaching said search engine.

18. A teleportation proxy service as recited in claim 16, wherein said software further configures said computer to provide:
   a comparator for comparing said contextual metadata and said search results.

19. A teleportation proxy service as recited in claim 16, wherein said software further configures said computer to provide:
   a further memory for storing said search results.

20. A teleportation proxy service as recited in claim 16, wherein said software further configures said computer to provide:
   a display control to sort said search results based upon quality of match to said contextual metadata.

21. A method of operating a virtual universe (VU) in connection with another activity of a user being conducted on a networked data processor, said method including steps of
   collecting current contextual metadata corresponding to at least one of a location, a time/date, an activity/event and a person/object and wherein said contextual metadata is related to a current island or VU of an avatar of said user, wherein said contextual metadata comprises information corresponding to the current context or circumstances of current usage of a computer or terminal by said user in regard to said at least one of said location, time/date, activity/event and/a person/object and excludes terms derived from a query or communication using said computer;
   developing a query for a search engine based on said contextual metadata collected in said collecting step;
   searching for VU locations having metadata corresponding to said query to form search results upon detection of a change in said contextual metadata; and
   responsive to said forming of search results based on said new search query, suggesting one or more VU locations having metadata corresponding to a portion of said contextual metadata based on said search results as a potential teleportation destination for an avatar corresponding to said user into said VU location, wherein the one or more VU locations are in one or more alternative islands or VUs offering a similar or same virtual experience of said current island or VU in terms of setting, whereby suggestions of potential teleportation destinations related to said current context and circumstances of computer usage by said user are made to said user transparently.

* * * * *